(12) United States Patent
Viola et al.

(10) Patent No.: US 9,029,479 B2
(45) Date of Patent: May 12, 2015

(54) PROCESS FOR THE SYNTHESIS OF FUNCTIONALIZED POLY (1,3-ALKADIENES) AND USE THEREOF IN THE PREPARATION OF HIGH IMPACT VINYL AROMATIC POLYMERS

(75) Inventors: Gian Tommaso Viola, Cervia (IT); Leonardo Chiezzi, Curtatone (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 1116 days.

(21) Appl. No.: 13/059,533

(22) PCT Filed: Aug. 7, 2009

(86) PCT No.: PCT/EP2009/005893
§ 371 (c)(1),
(2), (4) Date: May 10, 2011

(87) PCT Pub. No.: WO2010/020374
PCT Pub. Date: Feb. 25, 2010

(65) Prior Publication Data
US 2011/0207884 A1     Aug. 25, 2011

(30) Foreign Application Priority Data
Aug. 20, 2008 (IT) .............................. MI2008A1524

(51) Int. Cl.
| | | |
|---|---|---|
| C08F 279/02 | (2006.01) |
| C08F 2/38 | (2006.01) |
| C08C 19/44 | (2006.01) |
| C08F 2/00 | (2006.01) |
| C08F 291/00 | (2006.01) |
| C08F 293/00 | (2006.01) |
| C08L 15/00 | (2006.01) |
| C08L 51/04 | (2006.01) |
| C08F 212/08 | (2006.01) |
| C08F 212/12 | (2006.01) |

(52) U.S. Cl.
CPC . *C08C 19/44* (2013.01); *C08F 2/00* (2013.01); *C08F 279/02* (2013.01); *C08F 291/00* (2013.01); *C08F 293/005* (2013.01); *C08L 15/00* (2013.01); *C08L 51/04* (2013.01); *C08F 212/08* (2013.01); *C08F 212/12* (2013.01)

(58) Field of Classification Search
CPC ................. C08F 279/02; C08F 4/48
USPC ............................ 525/331.9, 316, 54; 526/83
See application file for complete search history.

(56) References Cited

U.S. PATENT DOCUMENTS

| | | |
|---|---|---|
| 6,255,402 B1 | 7/2001 | Boutillier et al. |
| 6,262,179 B1 | 7/2001 | Nicol |
| 7,125,934 B1 * | 10/2006 | Parker ..................... 525/331.9 |
| 2004/0006187 A1 * | 1/2004 | Viola et al. .................... 526/173 |
| 2007/0004869 A1 | 1/2007 | Parker |
| 2010/0087612 A1 * | 4/2010 | Montoya-Goni et al. .... 526/279 |

OTHER PUBLICATIONS

International Search Report Issued Oct. 20, 2009 in PCT/EP09/005893 filed Aug. 7, 2009.

* cited by examiner

*Primary Examiner* — Ling Choi
*Assistant Examiner* — Chun-Cheng Wang
(74) *Attorney, Agent, or Firm* — Oblon, McClelland, Maier & Neustadt, L.L.P.

(57) ABSTRACT

Process for the preparation of vinyl aromatic (co) polymers grafted on an elastomer in a controlled manner, comprising: dissolving an elastomer functionalized with bromoalkanes and nitroxy radicals, soluble in non-polar solvents, in a liquid phase consisting of a mixture of vinyl aromatic monomer(s)/polymerization solvent; feeding at least one radical initiator to the mixture, containing the functionalized elastomer in solution, and polymerizing the mixture thus obtained at a temperature higher than or equal to 1200 C; recovering the vinyl aromatic (co) polymer obtained after devolatization; and recycling the solvent/monomer(s) mixture, coming from the devolatization, to step (a).

8 Claims, No Drawings

PROCESS FOR THE SYNTHESIS OF FUNCTIONALIZED POLY (1,3-ALKADIENES) AND USE THEREOF IN THE PREPARATION OF HIGH IMPACT VINYL AROMATIC POLYMERS

The present invention relates to a process for the synthesis of functionalized poly(1,3-alkadienes) and the use thereof in the preparation of high impact vinyl aromatic polymers and co-polymers.

More specifically, the present invention relates to a process for the preparation of vinyl aromatic polymers or co-polymers, hereinafter (co)polymers, grafted in a controlled manner on functionalized poly(1,3-alkadienes), wherein the alkadiene group comprises from 4 to 8 carbon atoms.

Even more specifically, the present invention relates to a process for the preparation of styrene (co)polymers grafted on functionalized polybutadiene in the presence of a system suitable for living radical polymerization.

The term "living radical polymerization", as used in the present description and claims, means a conventional radical polymerization also carried out in the presence of a chemical species capable of reversibly reacting with the radical of the growing polymeric chain. This chemical species consists, for example, of stable nitroxides or alkoxyamines. More detailed information on living radical polymerization can be found in U.S. Pat. No. 4,581,429, in European patent 869,137 or in the "Handbook of Radical Polymerization" Wiley Interscience 2002.

In the present description, all the mentioned conditions should be intended as preferred conditions, even if not expressly declared.

Processes for the preparation of vinyl aromatic (co)polymers grafted on an elastomer (rubber) in a controlled manner, are known in literature. In U.S. Pat. No. 6,262,179, for example, a process is described for preparing a vinyl aromatic polymer reinforced with a rubber, characterized by a mono or bimodal morphology comprising polymerization of the vinyl aromatic monomer in a solution containing a rubber by means of an initiator system comprising a stable radical generator. At the end of the polymerization, a product consisting of a polymeric rigid matrix is obtained, in which the rubber particles are dispersed, whose morphology is still determined, however, as in the traditional processes which use non-stable polymerization initiators, by the type of rubber used.

In U.S. Pat. No. 6,255,402 a process is described for preparing a composition consisting of a polymeric vinyl aromatic matrix in which rubber particles are dispersed, having a morphology different from that known as "salami" but of the "labyrinth" "onion" or, preferably, "core shell" type, so as to provide a high impact final product with improved surface gloss characteristics. The same U.S. patent gives information on the meaning of the terms which identify the above-mentioned morphological forms.

A characteristic of this process is to succeed in obtaining a different morphology by using the homopolymer of 1,3-butadiene (hereinafter butadiene), as rubber, which, traditionally, gives a morphology substantially of the "salami" type.

The process explained in the U.S. patent in question comprises dissolving the polybutadiene rubber in a solvent in the absolute absence of a monomer and functionalizing the rubber dissolved by means of an initiator system consisting of a traditional radical initiator, a peroxide, for example, and a stable radical initiator, 2,2,6,6-tetramethyl-1-piperidinyloxy (known as TEMPO), for example, operating at temperatures ranging from 50 to 150° C., under stirring for several hours. At the end, the vinyl aromatic monomer is added and it is then polymerized until the desired conversion. The drawback of this patent is effecting the functionalization of the elastomer in the presence of the solvent alone.

Patent applications WO 00/14134 and WO 00/14135 describe the synthesis of vinyl aromatic polymers reinforced with rubber using polybutadienes functionalized with nitroxy radicals or nitroxy esters via reactive extrusion. The elastomers obtained are then dissolved in styrene and solvent and then polymerized. At the end of the polymerization, a product is obtained consisting of a rigid polymeric matrix in which the rubber particles are dispersed, whose morphology is independent of the type of rubber used but is only in relation to the quantity of nitroxy radical or nitroxy ester used in the reactive extrusion phase.

The drawback of these patent applications is to add a unitary operation in the production process of styrene materials reinforced with rubber.

The Applicant has now found a process for the preparation of vinyl aromatic (co)polymers grafted on an elastomer in a controlled manner, using elastomers functionalized with nitroxy radicals obtained directly during the synthesis phase of the elastomer with the use of bromo alkanes and nitroxy radicals, such as, for example, 1,1,3,3-tetraethylisoindolin-2-yloxyl (TEDIO), which is soluble in non-polar solvents.

The present invention also relates to the preparation of poly(1,3-alkadienes), preferably polybutadiene, obtained by the polymerization of at least one 1,3-alkadiene, such as butadiene, in a solution of aliphatic or cycloaliphatic solvents or a mixture thereof, by means of lithium-alkyl initiators.

In general, this type of polymerization can be carried out in batch reactors or continuous reactors. In batch reactors, the initiator, normally consisting of primary or secondary lithium-butyl, is added to the reaction mixture consisting of the solvent and monomer charged in such a quantity that the total amount of solid products at the end of the polymerization, does not exceed 20% by weight. Experts in the field know that this reaction can be carried out in the presence of Lewis bases in a quantity which depends on the content of vinyl or 1,2 units which are to be present in the polymeric chain. Among the Lewis basis, ethers are the most widely used, in particular tetrahydrofuran, which already in a quantity of 100 ppm with respect to the solvent, is capable of considerably accelerating the reaction, maintaining the vinyl unit content at levels lower than 12% (moles). For higher amounts of THF the microstructure is progressively modified up to contents of vinyl units higher than 40%, for example for quantities of THF equal to 5,000 ppm. High quantities of vinyl units are not necessary and can even be harmful for the use, for example, of polybutadiene in the field of the modification of plastic materials. It is preferable for the content of these units not to exceed the value of 15%, even if, for a higher grafting efficiency, it is possible to use polybutadiene with higher contents of 1,2 units.

Experts in the field also know that the reaction carried out in the absence of ethers or tertiary amines is sufficiently rapid to guarantee the complete polymerization of the monomer in times not higher than 1 hour with final temperatures not exceeding 120° C., and, in any case, regulated by the initial temperature of the reaction mixture which cannot be lower than 35-40° C., as the initial reaction would not be sufficiently rapid, and incompatible with the normal production cycles.

For the above purpose, the reactor can be equipped with cooling jackets, not particularly efficient due to the unfavourable surface/volume ratio, typical of industrial reactors, whose volume is never lower than 20 m$^3$. A more effective temperature control is obtained by means of a partial evaporation of the solvent which is condensed and subsequently fed to the reaction reactor. This type of reactor, called "boiling reactor" is extremely efficient for controlling the reaction temperature and, in the state of the art, it represents the best way for effectively limiting the natural increase in temperature due to the polymerization heat of the monomers such as butadiene.

Effecting the polymerization in reactors of the batch type, causes the formation of a polymer which, before the possible addition of a coupling agent, has a monomodal molecular weight distribution, wherein the ratio between the weight average molecular weight (Mw) and the number average molecular weight (Mn) is very close to 1, generally between 1 and 1.2.

If, on the contrary, the polymerization is run in a continuous reactor of the CSTR type or in several continuous reactors of the CSTR type positioned in series, a polymer is obtained having a monomodal molecular weight distribution, wherein the Mw/Mn ratio is in the range of 1.8 to 2.5.

In both cases the polymer, at the end of the polymerization, is linear and has the chain terminals still active, said terminals consisting of the species lithium-polyalkadienyl (polybutadienyl, in the case of butadiene monomer). The possible addition of a protogenic agent (alcohol, for example), or a halo-derivative of silicon wherein the ratio between the halogen and silicon is equal to 1 (a non-limiting example is trimethyl chlorosilane, TMCS) causes the termination of the lithium-butadienyl terminal, at the same time preserving the linear macrostructure of the molecule.

The addition of a polyfunctional substance capable of reacting with the active terminals, on the contrary, causes the formation of a branched macrostructure characterized in that it has a node from where a number of branches depart equal to the functionality of the polyfunctional substance used. As a non-limiting example, experts in the field know that the addition of silicon tetrachloride to the reaction environment, in a Si:Li ratio=1:4, causes the formation of a radial polymer which, in the case of a polymer prepared in a batch reactor, has four branches with the same length, whereas, in the case of a polymer prepared in continuous, the four branches are different.

The use of halo-alkanes, preferably bromo-alkanes and even more preferably primary bromo-alkanes, for generating primary radicals in situ by the reaction of said bromo-alkanes with butyl lithium added at the end of the reaction, is also known, for example, from U.S. Pat. No. 6,858,683. Primary radicals of the alkyl type, once formed, react with the protons (transfer) present on the polymeric chain, in an allyl position, for example polybutadiene, with the formation of a secondary polymeric macro-radical of the allyl type. Branched structures are obtained by the subsequent coupling of the polymeric macro-radicals, capable of modifying the rheology of the elastomers (polymers) on which said reaction has been effected. The reaction mechanism has been described by Viola G. T. in the article *Coupling reaction of polyisoprenil-lithium with 1,2 dibromoethane*, Journal of Polymer Science: Part A: Polymer Chemistry, Vol. 35, 17-25 (1997) of which the conclusions can also be applied to styrene-butadiene statistic copolymers.

U.S. Pat. No. 6,858,683 describes the preparation of a styrene-butadiene copolymer in which the elastic module is increased with respect to a linear polymer and wherein the properties, in terms of dispersion of the filler consisting of carbon black, are improved. Said method can be applied both on polymers which are still active (with lithium butadienyl terminals) and on terminated polymers, with both mono-functional and poly-functional substances, in this case with the generation of more interconnected structures.

It has now been surprisingly found, as better illustrated in the claims, that said secondary allyl macro-radicals, can react with substances belonging to the group of "radical scavengers" or "spin trappers", before their reciprocal coupling. The rate at which these substances react with the secondary allyl radicals is in fact some orders of magnitude higher than that of the coupling of the same allyl radicals which normally require several minutes before completion, as will be demonstrated in the examples illustrated (examples 2 and 4). It therefore follows that the addition of stoichiometric quantities of a "radical scavenger" immediately after the generation of allyl macro-radicals, prevents the latter from being coupled and generating branchings, maintaining the structure of the polymer practically identical to that before the formation of the macro-radicals. Various substances are known in the art capable of reacting with the allyl radicals present, with such rates as to allow their use as exceptional polymerization inhibitors or, in general, of reactions whose propagation takes place through radicals: the presence of an odd number of electrons characterizes a group of products which are defined as "living radicals", as these substances have the characteristic of having an uncoupled electron capable of reacting with other possible radicals present. In the case of substances in which the N—O group is present (known as N-oxides or nitroxy radicals), in which the nitrogen atom is bound by means of simple bonds to two methylene groups, it is known that said uncoupled electron, attributable to the nitrogen atom, can react with the uncoupled electron of a carbon radical, forming a O—C bond which, in relation to the temperature, reforms the two original radicals by homolysis. The treatment of a polymeric solution with deactivated radicals, or not, with lithium butyl and subsequently with a bromo alkane, causes the formation of allyl macro-radicals which, after the addition of a substance containing an N-oxide group, still have the same structure as the starting polymer but is functionalized as N—O—C groups are present on the polymeric chain, where the nitrogen atom is part of a saturated cyclic structure and the carbon atom is part of a polydiene structure in the allyl position.

The normal production process, for example, of polybutadiene, in this case functionalized, comprises, after the addition of a pair of antioxidants, consisting of a primary antioxidant of the phenolic type and a secondary antioxidant, typically an organic compound of trivalent phosphorous, the elimination of the solvent which is effected by the combined action of water and vapour, in stirred containers. A suspension of elastomer granules in water is produced, from which, after draining on nets, the elastomer is sent to a drying reaction consisting of two mechanical extruders. In the first extruder (expeller) a squeezing operation is effected to eliminate the large majority of water through side slits of the extruder, whereas the complete drying is effected in a second extruder (expander) in which the elastomer, subjected to mechanical action, heats to temperatures of 160-180° C. An aliquot of the vapour is eliminated by an opening (vent) situated at the end of the extruder, whereas a portion is eliminated at the output of the head. The elastomer granules are then sent by conveyor belts or other transportation methods, to a packer, where they are packaged in bales.

At the end of the preparation, the functionalized elastomer, preferably functionalized polybutadiene, can be used for the preparation of high impact thermoplastic polymers, high impact vinyl aromatic polymers, for example, also known as HIPS. In these polymers, the polybutadiene is in the form of a dispersed phase of particles, with a "core & shell" morphology, wherein said particles have an average diameter of 0.1 to 1 μm. This is an extremely surprising result as it is well-known among experts in the field that, in this type of application, an elastomer such as unfunctionalized polybutadiene always gives rise to particles with a "salami" morphology having an average diameter ranging from 2 to 5 μm. Although this morphology allows good performances with respect to impact resistance, the final polymer has very poor optical properties.

The nature of polybutadiene (elastomer or unsaturated rubber) requires a strict control of the finishing conditions as experts in the field are aware of the drawbacks deriving from the formation of lumps of insoluble substances (gels) which are normally formed in the finishing section, in particular in the expander. These gels cause a decrease of the quality of the rubber, destined for use in plastic modification due to the formation of large surface defects. Therefore, great attention must be paid for defining the finishing conditions of the polybutadiene with the consequent necessity of carrying out a large number of analyses for process and product control.

An object of the present invention therefore relates to a process for the preparation of vinyl aromatic (co)polymers grafted on an unsaturated elastomer in a controlled manner, comprising:

a. dissolving an elastomer functionalized with bromo-alkanes and nitroxy radicals, soluble in non-polar solvents, in a liquid phase consisting of a mixture of vinyl aromatic monomer(s)/polymerization solvent in a weight ratio ranging from 60/40 to 100/0, preferably from 60/40 to 90/10;

b. feeding at least one radical initiator to the mixture, containing the functionalized elastomer in solution, and polymerizing the mixture thus obtained at a temperature higher than or equal to 120° C., preferably between 120 and 200° C.;

c. recovering the vinyl aromatic (co)polymer obtained at the end of the polymerization and subjecting the same to vacuum devolatization for the recovery of the solvent and non-reacted monomer(s); and d. recycling the solvent/monomer(s) mixture, coming from the devolatization, to step (a).

According to the present invention, the preparation process of the vinyl aromatic (co)polymer can be effected in discontinuous (batch) or continuous. In the first case the dissolution of the functionalized elastomer, together with the conventional additives, in the liquid phase consisting of a mixture of vinyl aromatic monomer(s)/polymerization solvent and the subsequent polymerization of the monomer(s) take place in a single container, for example a stirred mixer, equipped with heating systems, from which the polymerization mixture is collected, for the recovery of the final (co)polymer to be subjected to the devolatization phase when the solid content has reached a level of 60 to 80% by weight. In the second case, on the contrary, the dissolution of the elastomer, together with the conventional additives, in the liquid phase (vinyl aromatic monomer(s) polymerization solvent) takes place in a stirred mixer which feeds, in continuous, one or more stirred reactors, selected from the stirred containers, such as CSTR (Continuous Stirred Tank Reactor), and/or tubular (Plug Flow) reactors. Also in this second case, the recovery of the final (co)polymer is effected through a devolatization step after the solid content has reached the above-mentioned levels. The continuous process described, for example, in European patent EP 400,479, is the preferred process according to this invention.

The term "vinyl aromatic (co)polymer", as used in the present description and claims, substantially means a (co) polymer obtained from the (co)polymerization of at least one monomer represented by the following general formula (I)

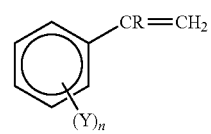

wherein R is hydrogen or a methyl group, n is zero or an integer ranging from 1 to 5 and Y is a halogen such as chlorine or bromine, or an alkyl or alkoxyl radical having from 1 to 4 carbon atoms.

Examples of vinyl aromatic monomers having the above general formula are: styrene, a-methyl styrene, methyl styrene, ethyl styrene, butyl styrene, dimethyl styrene, mono-, di-, tri-, tetra- and penta-chlorostyrene, bromo-styrene, methoxy-styrene, acetoxy-styrene, etc. Preferred vinyl aromatic monomers are styrene and/or α-methyl styrene.

The vinyl aromatic monomers having general formula (I) can be used alone or in a mixture of up to 50% by weight with other co-polymerizable monomers. Examples of these monomers are (meth)acrylic acid, $C_1$-$C_4$ alkyl esters of (meth) acrylic acid such as methacrylate, methyl methacrylate, ethyl acrylate, ethyl methacrylate, isopropyl acrylate, butyl acrylate, amides and nitriles of (met)acrylic acid, such as acrylamide, methacrylamide, acrylonitrile, methacrylonitrile, butadiene, ethylene, divinyl benzene, maleic anhydride, etc. Acrylonitrile and methyl methacrylate are the preferred co-polymerizable monomers.

Any elastomer suitable for being used as a reinforcing product in a vinyl aromatic (co)polymer can be functionalized and used in the process object of the present invention. The preferred product, due to its economic convenience, however, is polybutadiene homopolymer with a number average molecular weight (Mn) ranging from 50,000 to 350,000 and a weight average molecular weight (Mw) of between 100,000 and 500,000.

Other elastomers which can be used instead of polybutadiene or in a mixture with it, can be selected from homopolymers and copolymers of 1,3-alkadienes containing 40-100% by weight of 1,3-alkadiene monomer, butadiene, for example, isoprene or pentadiene, and 0-60% by weight of one or more mono-ethylenically unsaturated monomers, selected from styrene, acrylonitrile, α-methyl styrene, methyl methacrylate and ethyl acrylate, with a molecular weight Mw or Mn equal to that of the polybutadiene homopolymer. Non-limiting examples of copolymers of 1,3-alkadienes are styrene-butadiene block copolymers such as di-block linear elastomers of the S-B type wherein S represents a polystyrene block with an average molecular weight Mw of between 5,000 and 80,000, whereas' B represents a polybutadiene block with an average molecular weight Mw ranging from 2,000 to 250,000. In these elastomers, the quantity of block S ranges from 10 to 50% by weight with respect to the total S-B elastomer. The preferred product is the styrene-butadiene block copolymer having a styrene content of 40% by weight and a viscosity in solution, measured at 23° C. in a solution at 5% by weight of styrene, ranging from 35 to 50 cPs. Other examples of elastomers which can be used in the process object of the present invention, are those mentioned in European patent 606,931.

The functionalized elastomers described above are dissolved in the liquid phase comprising the monomer(s) and polymerization solvent. The preferred solvent according to the present invention is ethyl benzene, but other aromatic solvents, such as toluene or xylenes, or aliphatic solvents, such as hexane or cyclohexane, can be used.

At least the polymerization catalytic system can be added to the solution thus prepared, in a quantity of 0 to 0.5% by weight with respect to the total, preferably from 0.02 to 0.5%, consisting of one or more free radical initiators. The free radical initiators are selected in particular from those having an activation temperature higher than 50° C. Typical examples of polymerization initiators are azo-derivatives, such as 4,4'-bis-(diisobutyrronitrile), 4,4'-bis(4-cyanopentanoic acid), 2,2'-azobis(2-amidinopropane) dihydrochloride, or peroxides, hydroperoxides, percarbonates, and peresters. In general, the preferred free radical initiators are peroxides selected from t-butyl isopropyl monoperoxycarbonate, t-butyl 2-ethyl hexyl monoperoxycarbonate, dicumyl peroxide, di-t-butyl peroxide, 1,1-di(t-butyl peroxy cyclohexane, 1,1-di(t-butylperoxy)-3,3,5-trimethyl cyclohexane, (di-ter-butylperoxy cyclohexane), t-butylperoxy acetate, cumyl t-butyl peroxide, t-butyl peroxybenzoate and t-butyl peroxy-2-ethylhexanoate.

Other additives which can be added to the polymerization mixture are those traditionally known and used in the preparation of transparent, high impact vinyl aromatic copolymers. For example, the polymerization mixture can include a molecular-weight regulator, such as a mercaptan, selected from n-octyl mercaptan, n-dodecyl mercaptan, t-dodecyl mercaptan, mercaptoethanol, etc. Other additives are selected, for example, from antioxidants, UV stabilizers, antistatic agents etc.

The stable nitroxy radical characterized by the —NO• group is selected from those soluble in non-polar solvents and having general formula (II)

(II)

wherein groups R1, R2, R5 and R6, the same or different, are linear or branched alkyl radicals, substituted or non-substituted containing from 1 to 20 carbon atoms or alkyl aromatic radicals, wherein the alkyl group contains from 1 to 4 carbon atoms whereas groups R3 and R4, the same or different, are equal to R1, R2, R5 and R6 or R3-CNC—R4 belongs to a cyclic structure, for example with 4 or 5 carbon atoms, possibly condensed with an aromatic ring or with a saturated ring containing from 3 to 20 carbon atoms.

Examples of initiators having general formula (II) which are particularly preferred and which can be used in the process object of the present invention, are, for example, TEDIO (whose synthesis is described in patent application WO 2004/078720) and the palmitic ester of 4OH-TEMPO (4-hexadecanoicate-2,2,6,6-tetramethyl-piperidine-1-oxyl).

At the end of the functionalization of the elastomer, the finishing step of the same is effected, after which the polymerization process of grafted vinyl aromatic (co)polymers on the elastomer proceeds as in normal processes of the known art, by dissolving the elastomer in the monomer(s) and solvent and starting the polymerization reaction by increasing the temperature in one or more steps. At the end of the polymerization, the polymer is subjected to devolatilization for the recovery of the non-reacted monomer(s) and the solvent which are in such ratios as to be recycled to the mixer without having to be separated from each other. At the end, a high impact vinyl aromatic (co)polymer is recovered comprising a continuous phase consisting of the rigid vinyl aromatic matrix in which from 1 to 25% by weight, with respect to the total, of functionalized elastomer, for example and preferably, functionalized polybutadiene is dispersed, as non-continuous phase, in the form of particles with a "core shell" morphology, having average diameters ranging from 0.1 to 1 μm.

Some illustrative and non-limiting examples are provided for a better understanding of the present invention and for its embodiment.

Characterization of the Synthesized Polymers

1. Determination of Bound Styrene and Polybutadiene Microstructure

The method is based on the measurement of the intensity of the bands attributable to the three isomers of butadiene (trans, vinyl and cis). The spectrum areas used for the analytical determination of the isomers cis, trans and 1,2 of butadiene are: 1018 and 937 $cm^{-1}$ for the trans isomer, 934 and 887 $cm^{-1}$ for the 1,2 isomer and 800 and 640 $cm^{-1}$ for the cis isomer. The measurement of the absorbance in the peaks and a knowledge of the extinction coefficient values, measured on the standard polymers characterized via $^1$H-NMR, allows the quantity of the various structures of butadiene and the quantity of styrene, to be calculated by means of the Lambert-Beer law.

2. Determination of the Distribution of the Molecular Masses (MWD)

The determination of the molecular masses distribution is carried out by means of gel elution chromatography (GPC) also known as exclusion chromatography, effected by passing a solution in THF of the polymer object of the analysis over a series of columns containing a solid phase consisting of crosslinked polystyrene with pores having different dimensions.

Instrumental configuration:

Chromatograph: HP 1090;

Solvent: THF;

Temperature: 25° C.;

Columns: PL-Gel 105-105-104-103;

IR Detector: HP 1047 A.

The determination of the molecular masses is effected according to the Universal Calibration method using the following values for k and a:

k=0.000457 a=0.693.

3. Determination of the Average Molecular Weight and Measurement of the Branching Degree Through the SEC/MALLS Technique.

According to an internal method taken from the work described in Application Note, no 9, Wyatt Technology e Pavel Kratochvìl, Classical Light Scattering from Polymer Solutions, Polymer Science Library, 5, Elsevier Science Publishers B.V.1987. By coupling a multi-angle light scattering detector (MALLS) with a normal elution system SEC/RI, it is possible to contemporaneously effect an absolute measurement of the molecular weight and the gyration radius of the macromolecules which are separated by the chromatographic system. The quantity of the light diffused by a macromolecular species in solution can be directly used for obtaining its molecular weight, whereas the angular variation of the scattering is directly correlated to the average dimensions of the molecule in solution. The fundamental relation which is normally used is the following:

$$\frac{K*c}{R_\theta} = \frac{1}{M_w P_\theta} + 2A_2 c \quad (1)$$

wherein:

K*=optical constant, which depends on the wave-length of the light used, the dn/dc of the polymer, the solvent used;

$M_w$=weight average molecular weight;

c=concentration of the polymeric solution;

$R_\theta$=light scattered intensity, measured at the angle θ;

$P_\theta$=function describing the angular variation of the light scattered;

$A_2$=second virial coefficient of the solvent, equal to 1 for an angle θ equal to zero.

For very low concentrations, (typical of a SEC system) (1) is reduced to $$\frac{K*c}{R_\theta} = \frac{1}{M_w P_\theta} \quad (2)$$

and by effecting the measurement on several angles, the extrapolation to angle null of the function $K*c/R_\theta$ in relation to sen 2θ/2 directly provides the molecular weight from the intercept value and the gyration radius from the slope.

Furthermore, as this measurement is effected for every slice of the chromatogram, it is possible to obtain a distribution of the molecular weight and of the gyration radius.

The macromolecular dimensions in solution are directly correlated to their branching degree: for the same molecular weight, the smaller the dimensions of the macromolecules with respect to the linear correspondent, the higher the branching degree will be. As a macromolecule which has nodes in its interior (radial structures and branched structures) has, for the same molecular weight, a smaller hydrodynamic volume with respect to a linear molecule, the slope of the line described above (coefficient α) will be greater or smaller depending on the smaller or greater interconnection degree of the structures. In particular, for linear macromolecules, the proportionality coefficient between gyration radius and molecular weight, proves to be equal to 0.58, whereas for branched molecules, this value becomes progressively lower with an increase in the number of nodes present in the macromolecule. For example, the statistical copolymer styrene-butadiene prepared by radical polymerization, in emulsion, (E-SBR) has an α value equal to 0.35-0.38.

Instrumental Configuration:

IR spectrometer: HP 1047 A of MALLS Wyatt Technology model DAWN-DSP;

Differential refractometer: KMX16-CROMATIX.

4. Determination of the Mooney Viscosity

The determination of the Mooney viscosity is effected at 100° C. with a rotor L and time (1+4) (ASTM D1646).

5. Determination of the Viscosity in a Styrene Solution

The method includes the preparation of a solution of polybutadiene in styrene at 5% by weight and the subsequent measurement of the viscosity at 25° C. using a Cannon Fenske capillary tube whose dimension must be selected avoiding that the elution time through the capillary is within the range of 100-200 seconds.

In the case of the polymers examined, the Model 300, suitable within the range of viscosity 50-250 cP, is used.

6. Determination of the Average Molecular Weight of the Polystyrene Matrix.

The determination of the average molecular weight of the polystyrene matrix was effected on chromatographic equipment consisting of: a degasser system, pump, injector: WATERS Alliance 2695, set of Phenogel columns (300×7.6 mm) of 5 micrometers, porosity 106, 105, 104, 103 Angstrom, a Waters 410 differential refractive index detector, UV Waters 2487 detector, chromatographic analysis software: Millenium 32 version 3.2 (Waters).

7. Determination of the Morphology of the Elastomeric Phase Dispersed in HIPS

The dimensions and morphology of the elastomeric phase dispersed in the polystyrene matrix were determined by means of T.E.M. (Transmission Electronic Microscopy), according to F. Lenz, A. Wiss-Mikroscopie 63, 1956, page 56. The morphology of the elastomer particles was determined by visual inspection of the micrographies and the characterization of the various structures was effected in accordance with the classification described in "Teilchenbildung bei der Herstellung von Kautschukmodifiziertem Polystyrol" of Adolf Echte 58/89 (1977), page 175-198, and in EP 716.664. For the calculation of the statistical parameter average volumetric Diameter of the particles DV the following formula was applied:

$$D_v = \frac{\Sigma_i N_i D_i^4}{\Sigma_i N_i D_i^3} \quad (3)$$

wherein $D_i$ represents the diameter of the i-th particle whereas for the calculation of the percentage of particles of the "core shell" type or with a "mixed" structure (labyrinth or brain) the stereological method was used, described in C. Maestrini et al. Journal of Material Science, Vol. 27. The T.E.M. analysis was carried out on a transmission electron microscope Philips CM120.

8. Other Characterizations

The concentration of the residual styrene monomer and other volatile organic substances was determined by means of gas-chromatography;

The mineral oil content was determined by FTIR chemometry. The experimental values determined are always slightly lower than the calculated values as a certain quantity of oil is stripped during the devolatization step;

The concentration of polybutadiene in the HIPS was determined by iodometric titration in accordance with the method of Wijs, Berichte, 1898, Vol. 31, page 750;

The gel phase content (after thermal crosslinking of the elastomer) and swelling index (without thermal crosslinking of the elastomer) were determined by means of the Ruffing test described in U.S. Pat. No. 4,214,056;

The Melt Flow Index (MFI) was measured in accordance with the standard method ASTM D 1238 at 200° C. under a weight of 5 kg;

The notched Izod value (on injection moulded test samples) was determined in accordance with the standard method ISO 180/1A-ISO 179 (values expressed as kJ/m²). Another parameter relating to the resistance of the materials is represented by the Ball Drop, determined in accordance with the standard method ISO 6603/2 on two different thicknesses of test specimens (2 mm and 3 mm).

The tensile strength properties (yield point, yield elongation, ultimate stress, ultimate elongation, tensile modulus) and the flexural strength properties (ultimate stress, elastic modulus) were measured on injection moulded test specimens in accordance with the standard methods ASTM D 638, ISO 527, ISO 178 and expressed as MPa, with the exception of the yield elongation and ultimate elongation which are expressed as percentages.

The material gloss was determined in accordance with the standard method ASTM D523 at two reading angles (20 and 60° C.) by using a Dr. Lange glossimeter. The measurement was effected on test specimens with three steps obtained by injection moulding with measurements of the reading area equal to: 95 mm×75 mm×3 mm. The moulding conditions of the test samples were the following: temperature of the melt 220° C. and temperature of the mould 29° C.

EXAMPLE 1 (COMPARATIVE)

The following products are introduced in order, in a flow of nitrogen, into a reactor kept anhydrous with a volume of 100 liters equipped with a stirrer and heating jacket in which a diathermic oil is circulated at a temperature of 50° C.: 50 kg of anhydrous cyclohexane, 6.5 kg of anhydrous butadiene without an inhibitor and acetylene hydrocarbons and 5 g of THF. When the reaction mixture reaches a temperature of 40° C., 2.6 g of lithium butyl in a solution at 15% by weight in cyclohexane, are added. When the conversion is complete, at a temperature of 105° C., an aliquot of trimethyl chlorosilane equal to 2.77 g is fed to the reactor for the complete termination of the chain-ends.

The reagent mixture is then discharged into a pressurized container where a mixture of antioxidants consisting of Irganox® 565 and Irgafos®168 is added in such a quantity that their content in the elastomer is equal to 0.1 and 0.4% respectively.

The polymer is then separated from the solvent by stripping in a stream of vapour and subsequently dried mechanically in a calender. The determination of the molecular weight distribution, effected by means of gel permeation chromatography (GPC) gave number average molecular weight value Mn equal to 256,000 and a dispersion index value (Mw/Mn) equal to 1.02. GPC-MALLS analysis gave an alpha value equal to 0.58 typical of a linear polymer. IR analysis for the content of 1,2 units gave a percentage of 11.5%.

The Mooney viscosity (4+1 @100° C.) was equal to 42, whereas the viscosity in styrene was equal to 97 cP.

1.8 kg of polybutadiene thus obtained are dissolved at 60° C. for 6 hours with 25.8 kg of styrene monomer, 1.8 kg of ethylbenzene, 0.8 kg of Primoil 382 oil and 14 g of Tx22E50 (1,1-di(tert-butylperoxy)cyclohexane). The solution thus obtained is transferred to a first PFR reactor equipped with a stirrer and temperature regulation system, with a thermal profile of the reactor increasing from 125° C. to 135° C., where prepolymerization is effected with grafting and phase inversion.

15 g of NDM (n-dodecyl mercaptan) are added to the mixture leaving the first reactor, which is then fed to a second PFR reactor, also equipped with a stirrer and temperature regulation system, with a thermal profile of the reactor increasing from 135° C. to 160° C.

The mixture obtained is fed to a devolatizer operating under vacuum at a temperature of 235° C. in order to remove the non-reacted styrene and solvent from the polymer, thus obtaining the end-product whose characteristics are indicated in Tables 1 and 2.

EXAMPLE 2

The following products are introduced in order, in a flow of nitrogen, into a reactor kept anhydrous with a volume of 100 liters equipped with a stirrer and heating jacket in which a diathermic oil is circulated at a temperature of 50° C.: 50 kg of anhydrous cyclohexane, 6.5 kg of anhydrous butadiene without an inhibitor and acetylene hydrocarbons and 5 g of THF. When the reaction mixture reaches a temperature of 40° C., 2.16 g of lithium butyl in a solution at 15% by weight in cyclohexane, are added. When the conversion is complete, at a temperature of 105° C., an aliquot of lithium butyl equal to 0.83 g in a solution of cyclohexane at 5% is fed to the reactor and, after waiting 5', a second aliquot of lithium butyl equal to 6.6 g in a solution of cyclohexane at 5%. Immediately after the second addition of lithium butyl 20 g of octyl bromide in a solution at 20% of cyclohexane are added immediately followed by 25.6 g of 1,1,3,3-tetraethylisoindolin-2-yloxyl (TEDIO).

The reagent mixture is then discharged into a pressurized container where a mixture of antioxidants consisting of Irganox® 565 and Irgafos®168 is added in such a quantity that their content in the elastomer is equal to 0.1 and 0.4% respectively.

The polymer is then separated from the solvent by stripping in a stream of vapour and subsequently dried mechanically in a calender. The determination of the molecular weight distribution, effected by means of gel permeation chromatography (GPC) gave number average molecular weight value Mn equal to 250,000 and a dispersion index value (Mw/Mn) equal to 1.03. GPC-MALLS analysis gave an alpha value equal to 0.58 typical of a linear polymer. IR analysis for the content of 1,2 units gave a percentage of 11.2%. The Mooney viscosity (4+1 @100° C.) was equal to 40, whereas the viscosity in styrene was equal to 103 cP.

1.8 kg of polybutadiene thus obtained are dissolved at 60° C. for 6 hours with 25.8 kg of styrene monomer, 1.8 kg of ethylbenzene, 0.8 kg of Primoil 382 oil and 14 g of Tx22E50. The solution thus obtained is transferred to a first PFR reactor equipped with a stirrer and temperature regulation system, with a thermal profile of the reactor increasing from 125° C. to 135° C., where prepolymerization is effected with grafting and phase inversion.

15 g of NDM are added to the mixture leaving the first reactor, which is then fed to a second PFR reactor, also equipped with a stirrer and temperature regulation system, with a thermal profile of the reactor increasing from 135° C. to 160° C.

The final mixture obtained is fed to a devolatizer operating under vacuum at a temperature of 235° C. in order to remove the non-reacted styrene and solvent from the polymer, thus obtaining the end-product whose characteristics are indicated in Tables 1 and 2.

EXAMPLE 3 (COMPARATIVE)

The following products are introduced in order, in a flow of nitrogen, into a reactor kept anhydrous with a volume of 100 liters equipped with a stirrer and heating jacket in which a diathermic oil is circulated at a temperature of 50° C.: 50 kg of anhydrous cyclohexane, 6.5 kg of anhydrous butadiene without an inhibitor and acetylene hydrocarbons and 5 g of THF. When the reagent mixture reaches a temperature of 40° C., 1.5 g of lithium butyl in a solution at 15% by weight in cyclohexane, are added. When the conversion is complete, at a temperature of 102° C., an aliquot of trimethyl chlorosilane equal to 2 g is fed to the reactor for the complete termination of the chain-ends.

The reagent mixture is then discharged into a pressurized container where a mixture of antioxidants consisting of Irganox® 565 and Irgafos®168 is added in such a quantity that their content in the elastomer is equal to 0.1 and 0.4% respectively.

The polymer is then separated from the solvent by stripping in a stream of vapour and subsequently dried mechanically in a calender. The determination of the molecular weight distribution, effected by means of gel permeation chromatography (GPC) gave number average molecular weight value Mn equal to 360,000 and a dispersion index value (Mw/Mn) equal to 1.02. GPC-MALLS analysis gave an alpha value equal to 0.59 typical of a linear polymer. IR analysis for the content of 1,2 units gave a percentage of 11.7%.

The Mooney viscosity (4+1 @100° C.) was equal to 60, whereas the viscosity in styrene was equal to 204 cP.

1.8 kg of polybutadiene thus obtained are dissolved at 60° C. for 6 hours with 25.8 kg of styrene monomer, 1.8 kg of ethylbenzene, 0.8 kg of Primoil 382 oil and 14 g of Tx22E50. The solution thus obtained is transferred to a first PFR reactor equipped with a stirrer and temperature regulation system, with a thermal profile of the reactor increasing from 125° C. to 135° C., where prepolymerization is effected with grafting and phase inversion.

15 g of NDM are added to the mixture leaving the first reactor, which is then fed to a second PFR reactor, also equipped with a stirrer and temperature regulation system, with a thermal profile of the reactor increasing from 135° C. to 160° C.

The mixture obtained is fed to a devolatizer operating under vacuum at a temperature of 235° C. in order to remove the non-reacted styrene and solvent from the polymer, thus obtaining the end-product whose characteristics are indicated in Tables 1 and 2.

EXAMPLE 4

In a reactor configuration completely analogous to what is described in Examples 1 and 2, 1.57 g of lithium butyl are added to the reaction mixture consisting of 50 kg of cyclohexane and 6.5 kg of butadiene and 5 g of THF at a temperature of 40° C.

When the conversion is complete, at a temperature of 101° C., 0.80 g of lithium butyl in a solution of cyclohexane at 5% are added and, after waiting 5', a second aliquot of lithium butyl equal to 9.5 g in a solution of cyclohexane at 5%. Immediately after the second addition of lithium butyl, 28.5 g of octyl bromide in a solution at 20% of cyclohexane are added, immediately followed by 36.4 g of TEDIO.

The solvent is eliminated by stripping in a stream of vapour from the reagent mixture, containing a mixture of antioxidants consisting of Irganox® 565 and Irgafos® 168 in such a quantity that their content in the elastomer is equal to 0.1 and 0.4% respectively, and the polymer is subsequently dried mechanically in a calender. The determination of the molecular weight distribution, effected by means of gel permeation chromatography (GPC) gave number average molecular weight value Mn equal to 355,000 and a dispersion index value (Mw/Mn) equal to 1.07. GPC-MALLS analysis gave an alpha value equal to 0.58 typical of a linear polymer. IR analysis for the content of 1,2 units gave a percentage of 11.5%.

The Mooney viscosity (4+1 @100° C.) was equal to 58, whereas the viscosity in styrene was equal to 198 cP.

1.8 kg of polybutadiene thus obtained are dissolved at 60° C. for 6 hours with 25.8 kg of styrene monomer, 1.8 kg of ethylbenzene, 0.8 kg of Primoil 382 oil and 14 g of Tx22E50. The solution thus obtained is transferred to a first PFR reactor equipped with a stirrer and temperature regulation system, with a thermal profile of the reactor increasing from 125° C. to 135° C., where prepolymerization is effected with grafting and phase inversion.

15 g of NDM are added to the mixture leaving the first reactor, which is then fed to a second PFR reactor, also equipped with a stirrer and temperature regulation system, with a thermal profile of the reactor increasing from 135° C. to 160° C.

The mixture obtained is fed to a devolatizer operating under vacuum at a temperature of 235° C. in order to remove the non-reacted styrene and solvent from the polymer, thus obtaining the end-product whose characteristics are indicated in Tables 1 and 2.

TABLE 1

|  | Ex. 1 (compar.) | Ex. 2 | Ex. 3 (compar.) | Ex. 4 |
|---|---|---|---|---|
| PBDE characteristics | | | | |
| Mn PBDE | 256000 | 250000 | 360000 | 355000 |
| Mw/Mn PBDE | 1.02 | 1.03 | 1.02 | 1.07 |
| Viscosity | 97 | 93 | 204 | 198 |
| TEDIO | No | Yes | No | Yes |
| HIPS characteristics | | | | |
| % Elastomer | 7.9 | 7.8 | 7.8 | 7.7 |
| GPC (Dalton) | 174000 | 178000 | 175000 | 182000 |
| Mw/Mn | 2.52 | 2.51 | 2.50 | 2.48 |
| Swelling index | 13.8 | 13.4 | 14.1 | 14.0 |
| % Gel (after termal crosslinking) | 32.2 | 22.5 | 38.0 | 23.1 |
| Morphology | salami | core shell | salami | core shell |
| D[4, 3] | 2.5 | 0.58 | 4.5 | 0.59 |
| Gloss 20° | 10 | 62 | 3 | 61 |
| Gloss 60° | 40 | 92 | 25 | 91 |
| Melt index (200° C. -5 kg) | 5.3 | 6.2 | 4.5 | 6.4 |
| Vicat ISO 306 (1 kg-50 C./h) | 97.4 | 102.5 | 97.6 | 102.9 |
| IZOD ISO 23° C. (KJ/m$^2$), notched | 8.1 | 5.8 | 8.5 | 5.9 |
| Charpy ISO 23° C. (KJ/m$^2$), notched | 7.9 | 5.5 | 8.3 | 5.4 |

TABLE 2

|  | Ex. 1 (compar.) | Ex. 2 | Ex. 3 (compar.) | Ex. 4 |
|---|---|---|---|---|
| ISO 527 tensile | | | | |
| Yield stress (MPa) | 18.2 | 34.3 | 16.3 | 33.5 |
| Stress at break (MPa) | 23.9 | 26.1 | 22.4 | 26.5 |
| Elongation at break (%) | 66.0 | 15.5 | 65.0 | 15.3 |
| Elastic modulus (MPa) | 1510 | 2060 | 1350 | 2080 |
| ISO 178 flexural | | | | |
| Maximum stress (MPa) | 34.0 | 55.0 | 32.1 | 54.3 |
| Elastic modulus (MPa) | 1530 | 2070 | 1350 | 2090 |
| Impact perforation (falling weight) | | | | |
| Specimen thickness of 2 mm total energy (J) | 13.4 | 2.3 | 13.9 | 2.5 |
| Specimen thickness of 3 mm total energy (J) | 24.8 | 3.3 | 24.9 | 3.4 |

From the results indicated in Tables 1 and 2, it can be easily deduced that the functionalization of polybutadiene effected by reaction between bromo alkanes, n-butyl lithium and stable nitroxy radicals soluble in non-polar solvents, allows the production of a high impact polystyrene with a "core shell" morphology of the elastomeric phase and an excellent surface gloss, otherwise obtainable with a particularly expensive styrene-butadiene block copolymer. The use of the same polybutadiene not functionalized with the technique described, however, produces a high impact polystyrene with a morphology of the dispersed phase of the "salami" type with extremely poor aesthetic properties (gloss).

The invention claimed is:

1. A process for synthesizing a functionalized poly(1,3-alkadiene), the process comprising:
   anionically polymerizing at least one monomer of a 1,3-alkadiene in the presence of organic lithium and a low-boiling non-polar solvent to produce a polymer based on 1,3-alkadiene, and
   effecting a chain-termination phase of the polymer based on 1,3-alkadiene, at the end of the anionically polymerizing, by adding a bromo alkane comprising from 1 to 12 carbon atom followed by the addition of a product comprising a stable nitroxy radical of formula (II):

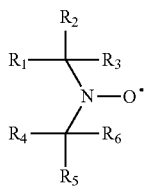

(II)

wherein R1, R2, R5 and R6 are each independently a linear or branched alkyl radical, substituted or non-substituted, comprising from 1 to 20 carbon atoms or an alkyl aromatic radical, wherein a alkyl group of the alkyl aromatic radical comprises from 1 to 4 carbon atoms, and R3 and R4 are each independently the same as one of R1, R2, R5 and R6 or R3-CNC—R4 is a cyclic structure, optionally condensed with an aromatic ring or with a saturated ring comprising from 3 to 20 carbon atoms.

2. The process according to claim 1,
wherein the 1,3-alkadiene is butadiene.

3. The process according to claim 1,
wherein the organic lithium is lithium butyl.

4. The process according to claim 1,
wherein the bromo alkane is 1-bromo octane.

5. A functionalized poly(1,3-alkadiene) obtained by the process of claim 1.

6. A process for preparing a vinyl aromatic (co)polymer, the process comprising:
   a. dissolving an elastomer functionalized with at least one bromo-alkane and at least one nitroxy radical, both the at least one bromo-alkane and the at least one nitroxy radical being soluble in at least one non-polar solvent, in a liquid phase comprising a mixture of 60% to 100% by weight of a vinyl aromatic monomer and 40% to 0% by weight of a polymerization solvent, based on a total weight of the mixture and a sum of the vinyl aromatic monomer and the polymerization solvent being 100% to form a mixture;
   b. feeding at least one radical initiator to the mixture comprising the functionalized elastomer in solution, and polymerizing the mixture obtained thereby at a temperature higher than or equal to 120° C.;
   c. recovering the vinyl aromatic (co)polymer obtained at the end of the polymerizing, and devolatilizing the recovered vinyl aromatic (co)polymer under vacuum, thereby recovering the polymerizing solvent and non-reacted vinyl aromatic monomer; and
   d. recycling a mixture comprising the polymerizing solvent and the vinyl aromatic monomer, obtained from the devolatilizing, to the dissolving.

7. The process according to claim 6,
wherein the vinyl aromatic monomer is a styrene and/or α-methylstyrene monomer.

8. A high impact vinyl aromatic (co)polymer, comprising:
a continuous phase, the continuous phase consisting essentially of a matrix comprising at least 50% by weight of a vinyl aromatic monomer, and
a dispersed phase, the dispersed phase consisting essentially of 1 to 25% by weight of the functionalized poly(1,3-alkadiene) of claim 6, based on a total weight of the high impact vinyl aromatic (co)polymer,
wherein the functionalized poly(1,3-alkadiene) comprises particles having core-shell morphology, and an average diameter ranging from 0.1 to 1 μm.

* * * * *